United States Patent [19]
Reid-Green

[11] Patent Number: 5,869,789
[45] Date of Patent: Feb. 9, 1999

[54] IMAGE DIGITIZER WITH PAGE NUMBER DETECTOR AND RECORDER

[75] Inventor: Keith S. Reid-Green, Pennington, N.J.

[73] Assignee: Educational Testing Service, Princeton, N.J.

[21] Appl. No.: 789,700

[22] Filed: Jan. 27, 1997

[51] Int. Cl.⁶ .............................. G08C 21/00; G09G 5/00
[52] U.S. Cl. .................................. 178/18.01; 178/18.03; 178/18.09; 345/172; 345/174
[58] Field of Search ..................................... 345/156, 172, 345/173, 174, 179; 178/18.01, 18.03, 18.05, 18.09, 20.01

[56] References Cited

U.S. PATENT DOCUMENTS 5,485,176  1/1996  Ohara et al. ............................ 345/173
5,579,034  11/1996 Aoyama et al. ......................... 345/172
5,631,741  5/1997  Matthews ................................ 345/173

*Primary Examiner*—Vijay Shankar
*Attorney, Agent, or Firm*—Woodcock Washburn Kurtz Mackiewicz & Norris LLP

[57] ABSTRACT

A digitizer system having a page recognition system and a method of using such digitizer system is disclosed. The page recognition system detects a page number pre-coded on a sheet of paper when the sheet of paper is mounted onto the digitizer system. When a sheet of paper which was previously mounted on the digitizer is re-mounted onto the digitizer, the digitizer recognizes the sheet of paper as having been previously digitized and re-loads the electronic file corresponding to the same sheet of paper. Thereafter, the digitizer records the annotations made by the digitizer operator to the previously digitized sheet of paper.

6 Claims, 5 Drawing Sheets

IMAGE DIGITIZER WITH PAGE NUMBER DETECTOR AND RECORDER

FIELD OF THE INVENTION

The present invention relates generally to image digitizers. More particularly, the invention relates to page number detection and recording using an image digitizer system.

BACKGROUND OF THE INVENTION

Image digitizers provide a means to capture strokes made with a digital stylus on a digitizing surface. Particular digitizer models provide a capability to record hand written materials on a sheet of paper while simultaneously generating an electronic copy. Such digitizers conventionally employ a pen-tipped stylus and a sheet of paper. The paper is mounted over a digitizing surface which includes detectors for sensing the strokes or annotations made on the paper using the stylus.

A conventional image digitizer is shown in FIG. 1. As shown, the digitizer 10 is connected to a workstation 12. As notations are made on the paper 14 using the pen-tipped stylus 16, an electronic copy of the notation is captured and represented on the workstation monitor 18. At the conclusion of a recording session, i.e., once the paper is removed, the electronic copy is stored for later retrieval and reproduction.

Image digitizers have proven useful in capturing information recorded on a single piece of paper during a single writing session. However, conventional image digitizers lack the capability to recognize and distinguish a particular sheet of paper. Therefore, once a sheet of paper has been recorded and removed from the digitizer, the digitizer cannot recognize that the same sheet of paper has been remounted onto the digitizer. The inability of the digitizer to recognize a particular sheet of paper precludes retrieving a previously stored image which corresponds to the remounted sheet of paper. In the context of written examinations, for example, it is often necessary to remount prior sheets of paper that have already been written on and make additional annotations or corrections. Because conventional digitizers are incapable of identifying a previously recorded page, such conventional digitizers cannot be effectively used in many applications such as written examinations.

U.S. Pat. No. 5,243,149 (Comerford) discloses an apparatus for improving the paper interface to a computer system. In that system, a previously digitized image of a page of hand written text can be printed on a new page of paper. The system will also print, on the same page, a bar code which uniquely identifies the image to the system. Thereafter, if the printed image is loaded onto the digitizer, a scanner attached to the digitizer can be used to scan the bar code. The bar code signifies to the system that the printed page is one that is stored in the system and provides indexing information from which the image can be retrieved. The system retrieves the digital image and allows the operator to make annotations.

Thus, Comerford discloses a method of annotating a system generated copy of previously hand written material. Comerford does not disclose a means to annotate the same sheet of paper which was previously mounted on the digitizer. This distinction is an important one. It is not always practical to print a previously digitized image for the purpose of generating a bar code which can then be used by the system to identify the particular page. For example, in a written examination it is desirable to permit test takers to simply remount any sheet of paper so that corrections and other annotations may be made to text previously written on the same sheet of paper. Moreover, it is not feasible during a testing session to direct test takers to print out digital images and apply bar codes to those printed sheets before making corrections or annotations as would be required by a system such as that disclosed by Comerford.

Therefore, there exists a need for an image digitizer capable of automatically detecting a page identifier for a sheet of paper mounted thereon and further capable of recording all annotations and corrections in an electronic file associated with the sheet of paper on which the corrections and annotations are made.

SUMMARY OF THE INVENTION

Accordingly, the present invention provides an image digitizer capable of automatically detecting a page identifier for a sheet of paper mounted thereon and further capable of recording all annotations and corrections in an electronic file associated with the sheet of paper on which the corrections and annotations are made.

This is accomplished in an image digitizer system for use with multiple sheets of paper, wherein each sheet of paper has a pre-recorded page identifier. The image digitizer system comprises a page detection means for detecting the pre-recorded page identifier on each mounted sheet and a recording means interfaced with the page detection means for recording the annotations made to each mounted sheet in an electronic file in association with the page identifier.

In one embodiment of the invention the system comprises a display for displaying the annotations. The recording means further includes a page searching means for determining whether the page identifier so detected was previously recorded and an access means interfaced with the page searching means for retrieving the electronic file corresponding to the detected page identifier and for displaying the annotations stored in the electronic file on the display.

In another embodiment of the image digitizer system, the page identifier includes a multiplicity of markings uniquely identifying the sheet of paper on which the multiplicity of markings are pre-recorded. The page detection means includes a multiplicity of photocells mounted on the image digitizer such that each of the multiplicity of photocells is positioned to detect one of the multiplicity of markings on each mounted sheet, each photocell generating a detection signal in response to detecting the marking and a processing means interfaced with the multiplicity of photocells to receive detection signals from the multiplicity of photocells, and based on the detection signals received determining the page identifier pre-recorded on the mounted sheet.

In another embodiment, the image digitizer system for use with a sheet of paper having a pre-recorded page identifier includes: an image digitizer operable to detect the pre-recorded page identifier on the sheet of paper and generate an identification signal; and a computer system interfaced with the image digitizer to receive the identification signal and for storing the pre-recorded page identifier in response to the identification signal.

Another aspect of the present invention is a method of operating an image digitizer system including the steps of: mounting a first sheet of paper in the image digitizer system; recording information relating to the first sheet of paper in an electronic file associated with the first sheet; mounting a second sheet of paper in the image digitizer system; recording information relating to the second sheet of paper in an electronic file associated with the second sheet; remounting the first sheet of paper in the image digitizer system; and recording information relating to the first sheet of paper in the electronic file associated with the first sheet.

Preferably, the method further includes the steps of: detecting the pre-recorded markings on the first sheet and the second sheet; and searching for the presence of one electronic file associated with the first sheet and one electronic file associated with the second sheet based on the pre-recorded markings detected.

Other features of the invention are described below.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE INVENTION

Figure 1:
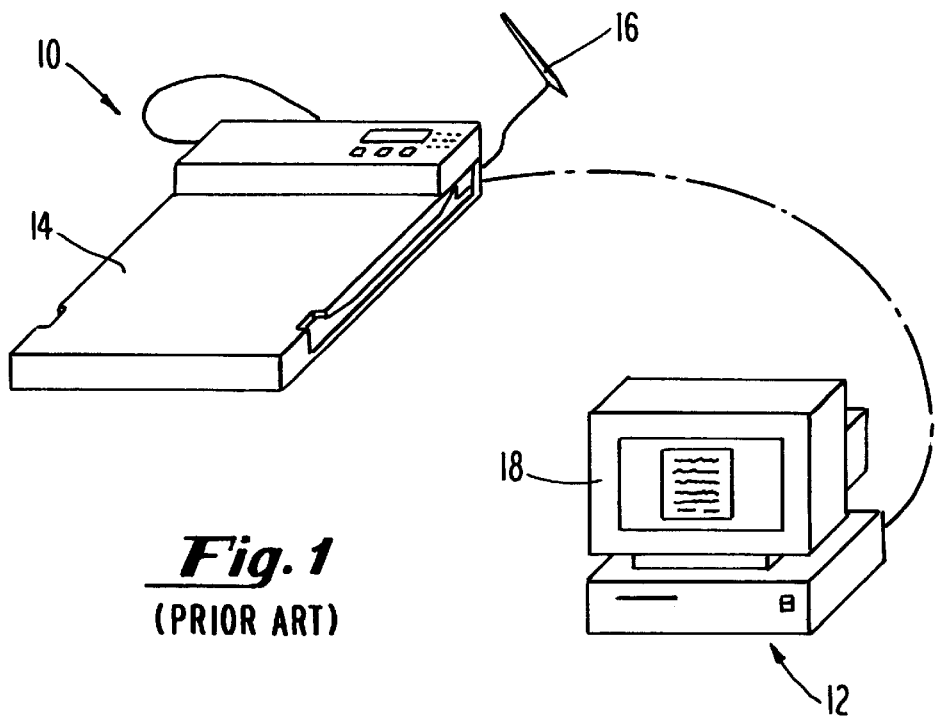
FIG. 1 is a diagrammatic perspective view of a prior art digitizer integrated with a computer system.
Figure 2:
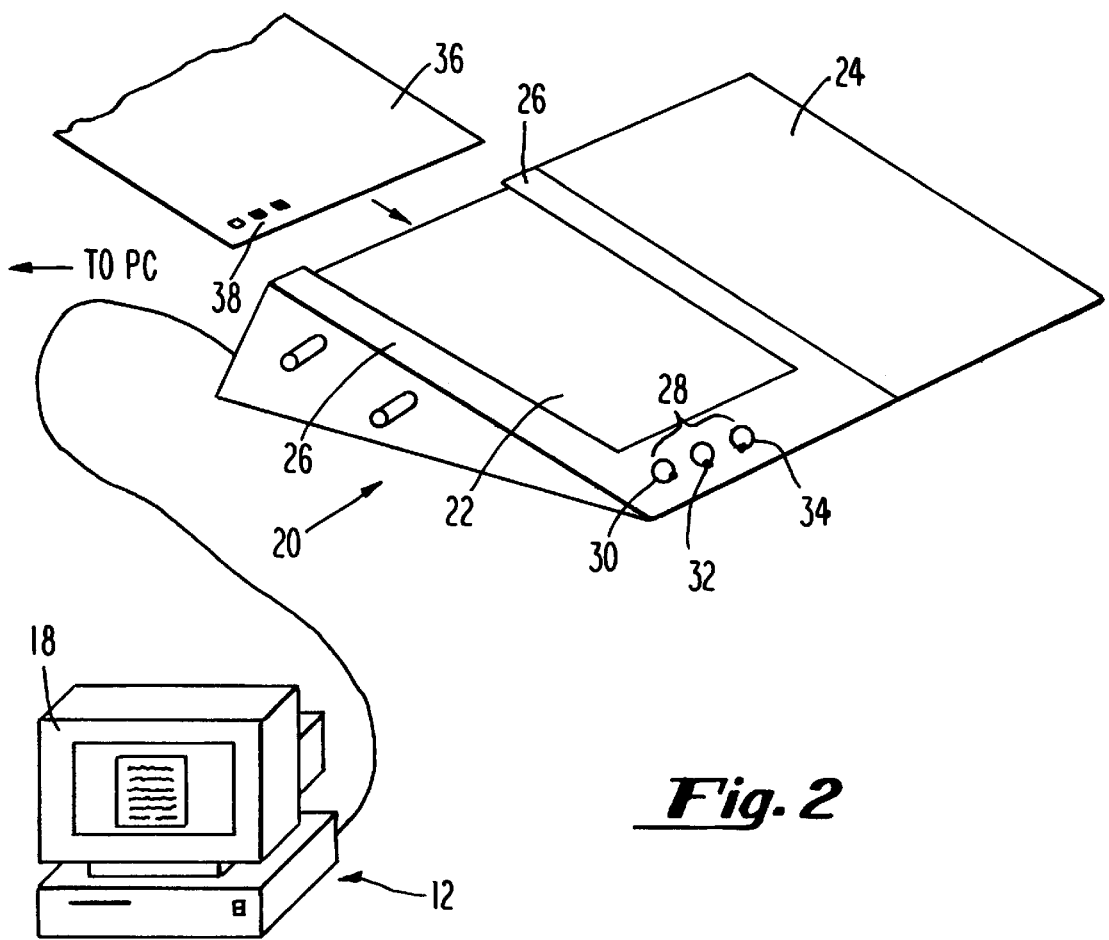
FIG. 2 is a perspective view of a digitizer having a page recognition system in accordance with the invention.

FIGS. 2, 3, 4, 5, 6, 7 and 8 depict a preferred embodiment of the present invention. FIG. 2 is a perspective view of the inventive digitizer 20 having a page recognition capability in accordance with the present invention. As shown, the digitizer has a full page writing surface 22 and a removable arm rest 24 which can be placed on either side of the digitizing surface 22 to accommodate left and right handed individuals. Paper guides 26 surround two sides of the digitizing surface 22 providing a means for mounting a sheet of paper 36 onto the digitizing surface 22.

As shown in FIG. 2, a page detector 28 for detecting a particular sheet of paper is located in the lower left corner of the digitizer. In the presently preferred embodiment, the page detector 28 comprises a combination of three photocells 30, 32, 34. Other detecting means such as a bar code scanner could similarly be used. The inventive digitizer is designed for use with a sheet of paper 36 which has a page number 38 coded on the bottom left corner. When a sheet of paper 36 is mounted onto the digitizer 20 by inserting it into the guides 26, the coded page number 38 aligns with the photocells 30, 32, 34. When the detector 28 detects the coded page number 38, the detector generates an identification signal which is output to a personal computer or workstation 12. The computer 12 receives and decodes the identification signal so as to ascertain the page number of the sheet of paper presently mounted on the image digitizer. The digitizer 20 can thereby recognize the sheet of paper 36 which has been mounted. It should be noted that the photocells 30, 32, 34 could similarly be placed in a location other than the lower left corner of the digitizer 20.

Figure 3:
FIG. 3 is a chart representing the various marking combinations which may appear on a particular sheet of paper for use with the present invention.

In a preferred embodiment, the three photocells 30, 32, 34 detect a series of three markings 38 located at the bottom left corner of a the sheet of paper 36. Each marking 38 is interpreted by the system as a binary digit. FIG. 3 depicts exemplary markings which may appear on a sheet of paper. Also shown is the base ten equivalent for each binary combination. Preferably, each page that is mounted onto the inventive digitizer system has one of these marking combinations in the lower left corner so as to align with the photocells 30, 32, 34 when mounted onto the digitizer. It should be noted that although the presently preferred embodiment employs a three digit number, greater or lesser order markings could alternatively be used.

Figure 4:
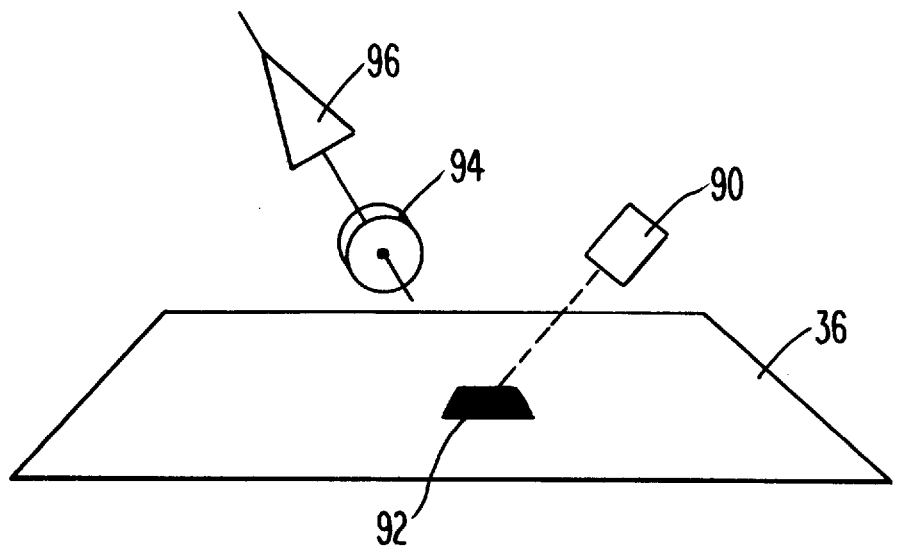
FIG. 4 is a illustrative diagram of a photo-cell and a sheet of paper with a page identifier marking.
Figure 5:
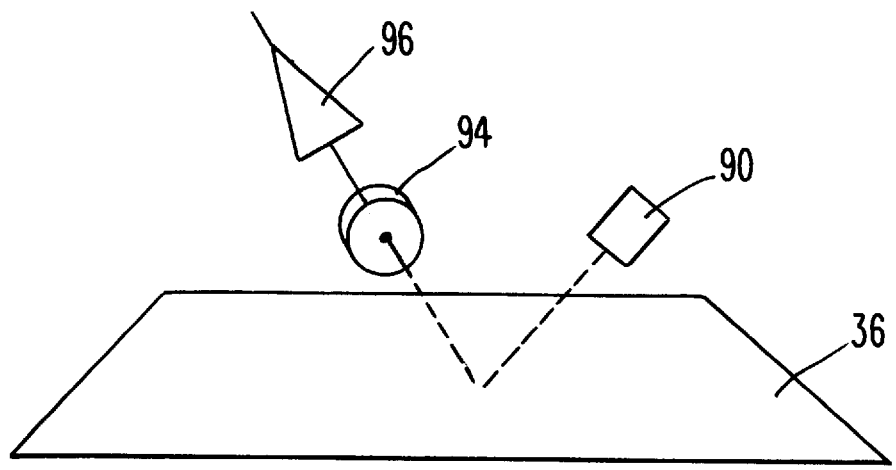
FIG. 5 is an illustrative diagram of a photo-cell and a sheet of paper without a page identifier marking.
Figure 6:
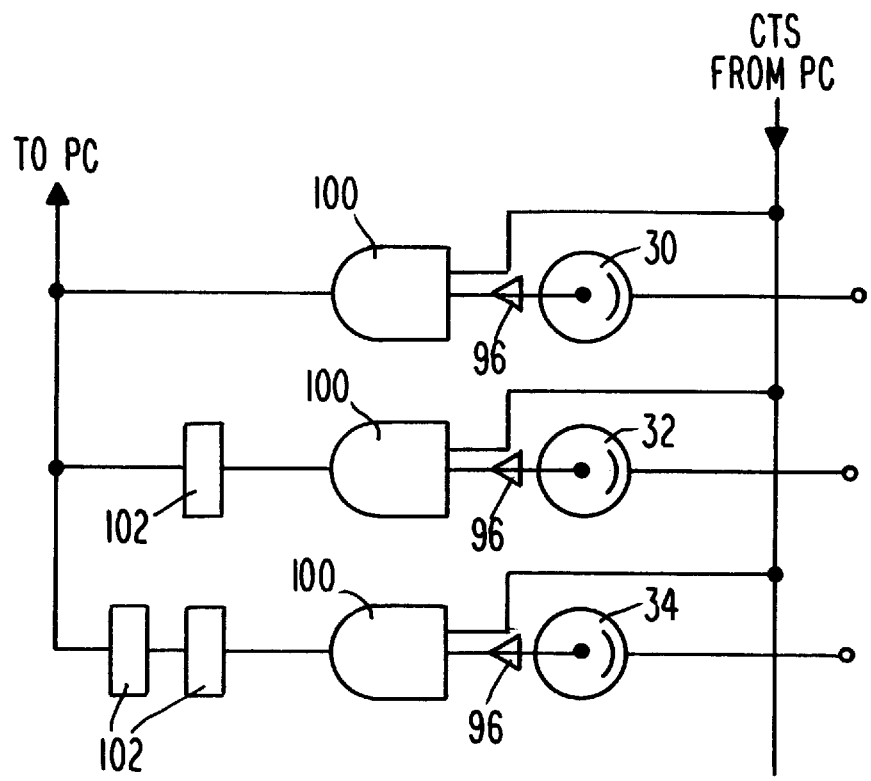
FIG. 6 is a logic diagram of the page identifier recognition apparatus.

FIGS. 4, 5, and 6 provide a detailed explanation of the page recognition apparatus. As shown in FIG. 4, a light source 90 is directed at the area of the sheet of paper 36 where a page number marking 92 should be located. When a page number marking 92 is located at the specific position on the sheet of paper 36 where the light source 90 is directed, the light is absorbed by the marking 92. A photo-cell 94 is positioned to detect light being reflected from the particular position on the sheet of paper 36. When there is no light being reflected as a result of the existence of the page number marking 92, the photo-cell 94 generates a logical "low" signal. An attached inverter 96 converts this "low" signal to a "high" signal.

Conversely, where as shown in FIG. 5 there is no marking at the specific point on the sheet of paper 36, the light generated by the light source 90 is reflected to the photo-cell 94. The photo-cell 94 detects the light and generates an electronic "high" signal. The "high" signal is converted by the attached inverter 96 into a logical "low" signal.

As previously mentioned, the presently preferred embodiment comprises three photo-cells 30, 32, 34. As shown in FIG. 6, the output from each invertor 96 is attached to one of the three photo-cells 30, 32, 34 immediately is logically connected to a logical "and" gate 100. The second input of each "and" gate 100 is connected to the computer 12. When the computer 12 is prepared to receive a page number from the digitizer, a "clear to send signal" indicated by a logical "high" value is transmitted to the digitizer. The "clear to send signal" is logically added to the output of each of the three inverter/photo-cell combinations. Thus, when a page marking 92 is detected, resulting in a logical "high" signal being generated by the inverter 96, and simultaneously a "clear to send" signal is transmitted by the computer 12, the logical "and" gate 100 logically adds the two signals to create a logical "high" signal. Conversely, when no page marking 92 is detected, a "low" signal is generated at the output of the logical "and" gate 100. As shown, the outputs of the three logical "and" gates 100 are transmitted to the attached computer 12. These three outputs correspond to the three digit binary number which represents the page number for the sheet of paper. Unit delays 102 insure synchronized transmission of the binary number to the computer 12.

Directing reference back to FIG. 2, when a sheet of paper 36 is mounted for the first time, the digitizer 20 detects the page number 38 and in conjunction with an attached computer determines that the sheet of paper 36 has not previously been mounted on the digitizer. The digitizer 20 records the movements of the stylus and an electronic representation is simultaneously displayed on an attached computer monitor. When the sheet of paper 36 is removed from the digitizer 20, the electronic file associated with the physical sheet of paper 36 is saved along with a notation of the corresponding identifying page number.

When a sheet of paper 36 which has previously been mounted on the digitizer 20 is remounted onto the digitizer 20, the digitizer system detects the page number 36, recognizes the page as having been previously digitized, and retrieves the electronic file which was stored for that particular sheet of paper. The operator thereafter may make additional annotations to the sheet of paper as if editing the page for the first time. The operator's markings are recorded on the sheet of paper as well as in the associated electronic file. When the sheet of paper is removed from digitizer, the annotations are saved along with the markings recorded when the sheet of paper was previously mounted. This process can be repeated to make further annotations.

Figure 7:
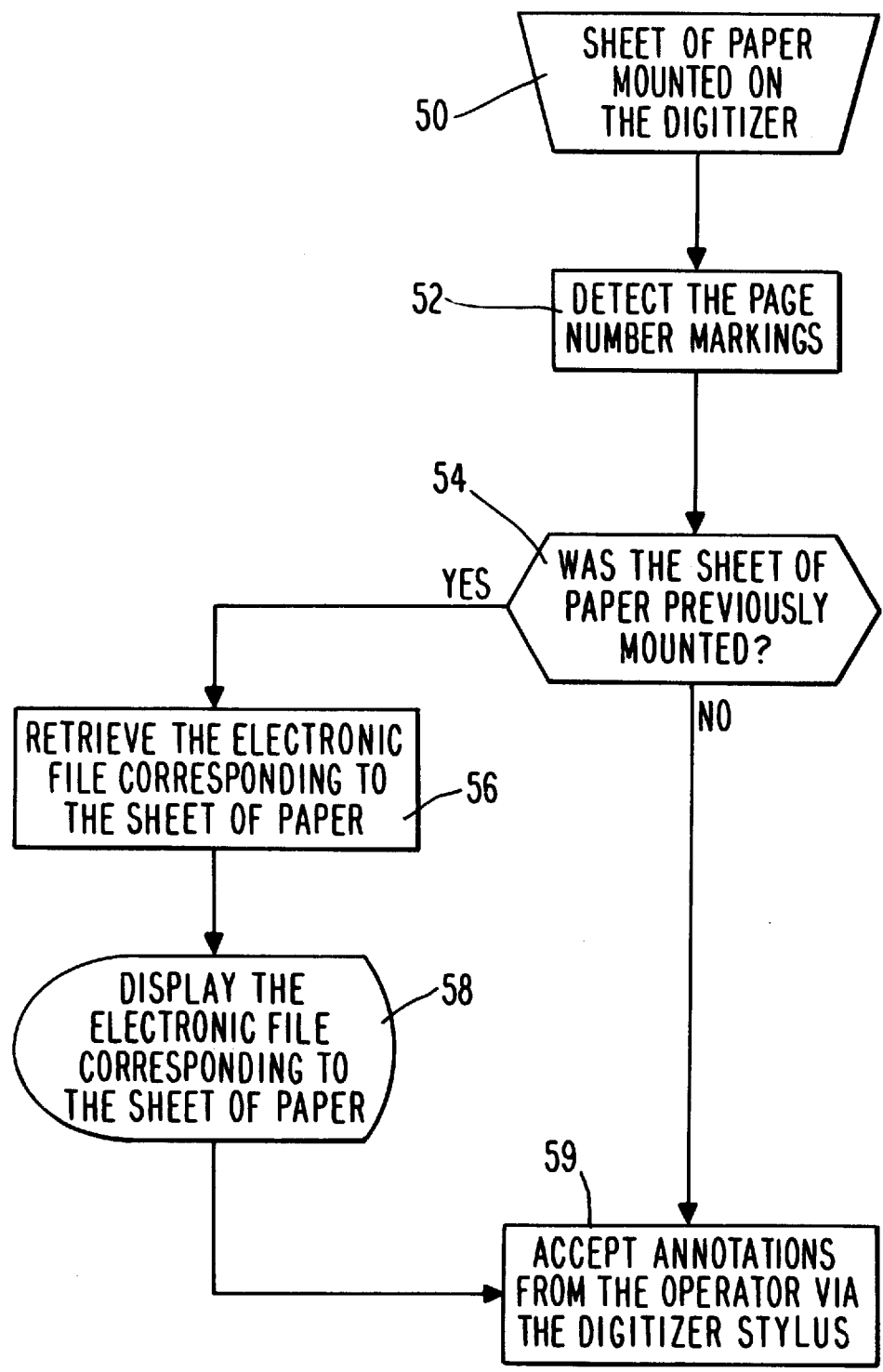
FIG. 7 is a general functional flow diagram of the page recognition process.

FIG. 7 provides a general functional flow diagram of the page recognition process. As represented at step 50, the page recognition process begins when a sheet of paper is inserted into the digitizer. Assuming the sheet of paper has been marked in the lower left corner, when the sheet is mounted on the digitizer, the page markings align with the digitizer photocells. As represented at step 52, the digitizer detects the page number markings of the sheet of paper. At step 54 the digitizer system determines whether the sheet of paper was previously mounted on the digitizer. For example, a computer program may be executed to search for an electronic file keyed to the page number of the mounted sheet of paper. If the page was previously mounted, the digital file corresponding to the page is retrieved at step 56 and displayed at step 58 on the computer monitor. Thereafter, at step 59 the digitizer is ready to accept annotations to the previously digitized sheet of paper. Similarly, if the sheet of paper has not been previously mounted, the digitizer stands ready to accept input from the stylus at step 59.

Figure 8:
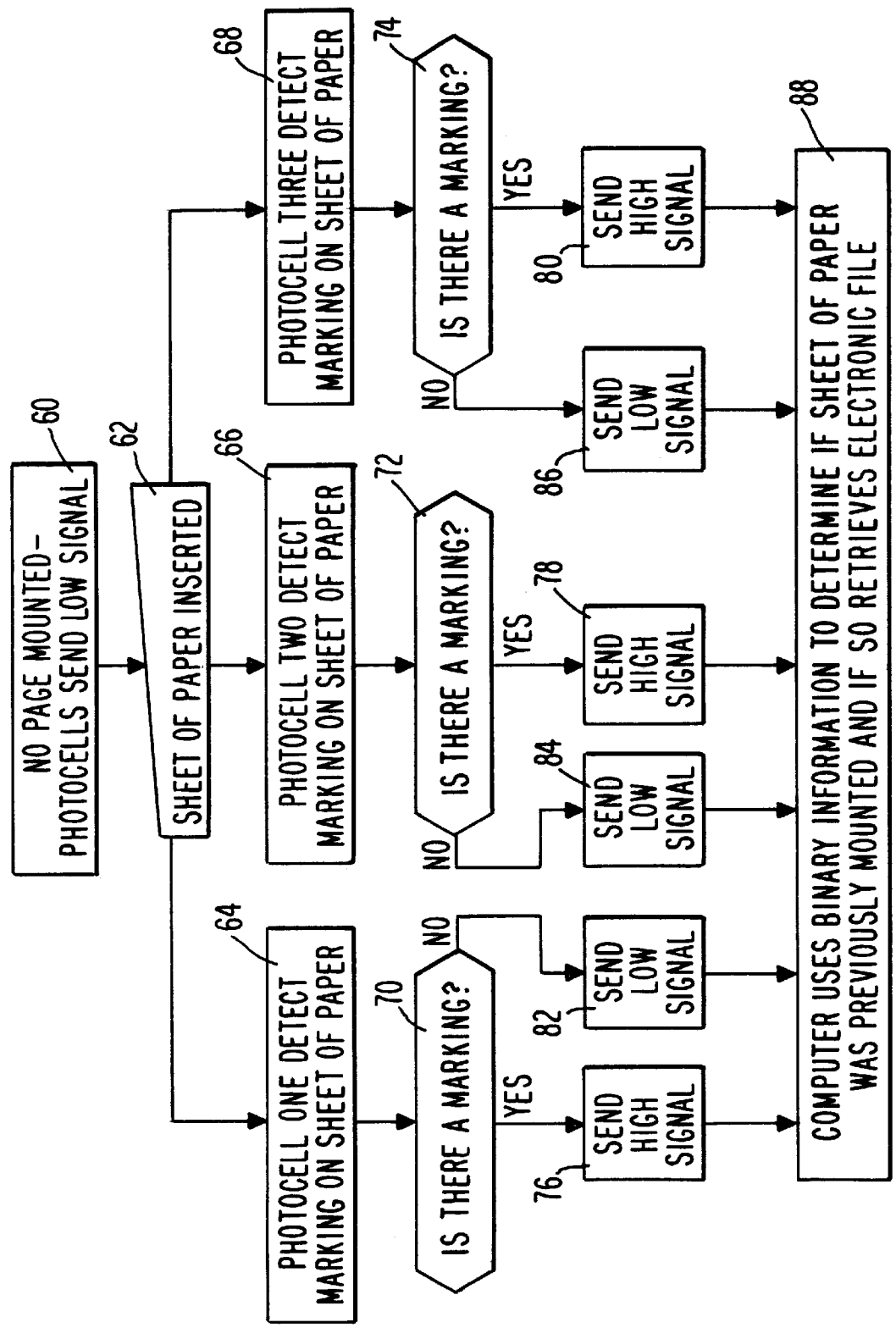
FIG. 8 is a detailed functional flow diagram of the page detection process.

FIG. 8 provides a detailed flow chart of the page detection processing in accordance with a preferred embodiment of the invention. As represented at step 60, when no paper has been mounted onto the digitizer, the three photocells that are used to detect the page markings indicate the lack of a marking by sending an electrical "low" signal to the attached computer. When a sheet of paper is inserted into the digitizer, as represented at step 62, each photocell scans the surface of the page for a marking 64, 66, 68. As shown at steps 70, 72, and 74 a photocell may detect a marking which causes the photocell to send an electrical "high" signal defining a detection signal at steps 76, 78, 80, respectively. Alternatively, the photocell may detect no marking in which case a low signal is generated at steps 82, 84, 86. As explained above, the outputs of the three photocells represent a three digit binary number. At step 88, the three digit binary number is relayed to the attached computer where it is determined whether the sheet of paper has previously been mounted. If the sheet of paper has previously been mounted onto the digitizer, the system will display the previously digitized image and allow the operator to begin making annotations. If the system determines that the sheet of paper has not been previously mounted on the system, the system will begin recording the operators markings in a new electronic file.

As described, the present inventive digitizer addresses several inadequacies in the prior art. Notably, the disclosed inventive digitizer provides a capability to detect and recognize a sheet of paper, determine if the sheet of paper was previously digitized, and allow for annotation to the sheet of paper if it was previously mounted on the digitizer. The present invention, in contrast to prior art devices, provides the opportunity for a digitizing device operator to record hand written responses freely by switching between pages and annotating previously stored pages. The present invention therefore addresses a significant inadequacy in the art and presents the possibility of employing a digitizer in areas such as essay examinations which previously were not adaptable to electronic test administration.

The present invention may be employed in other specific forms without departing from the spirit or essential attributes thereof. For example, the page detection apparatus may comprise more than three photo sensing units. Furthermore, alternative means such as a bar code reader could be used to identify particular sheets of paper. While the invention has been described and illustrated with reference to specific embodiments, those skilled in the art will recognize that modification and variations may be made without departing from the principles of the invention as described hereinabove and set forth in the following claims.

I claim:

1. An image digitizer system for recording in an electronic file annotations made to a sheet of paper having a pre-recorded page identifier located thereon when the sheet of paper is first loaded onto the system and recording in the electronic file subsequent annotations made to the same sheet of paper when the same sheet of paper is reloaded onto the system, the system comprising:

page detection means for detecting the pre-recorded page identifier when the sheet of paper is first mounted onto said system and for detecting the pre-recorded page identifier when the sheet of paper is re-loaded onto said system;

page searching means for identifying that the sheet of paper has not been previously loaded onto the system when the sheet of paper is first loaded onto the system and for identifying the sheet of paper as one previously annotated and stored when the sheet is re-loaded onto the system, said page searching means identifying the sheet of paper using the pre-recorded page identifier;

access means interfaced with said page searching means for retrieving the electronic file of annotations previously made to the sheet of paper when the sheet of paper has been reloaded onto the system;

recording means interfaced with said page detection means for recording annotations made to the sheet of paper in the electronic file where the electronic file is indexed to the pre-recorded page identifier; and display means for displaying annotations made to the sheet of paper.

2. The image digitizer system as recited in claim 1, wherein the page identifier includes a multiplicity of markings uniquely identifying the sheet of paper on which said multiplicity of markings are pre-recorded, and wherein the page detection means comprises:

a multiplicity of photocells mounted on the image digitizer such that each of the multiplicity of photocells is positioned to detect one of the multiplicity of markings on the sheet, each photocell generating a detection signal in response to detecting said marking; and a processing means interfaced with the multiplicity of photocells for receiving detection signals from said multiplicity of photocells and, based on the detection signals received, for determining the page identifier pre-recorded on the sheet.

3. An image digitizer system for recording in an electronic file, annotations made to a sheet of paper having a pre-recorded page identifier located thereon when the sheet of paper is first loaded onto the system and recording in the electronic file subsequent annotations made to the same sheet of paper when the same sheet of paper is reloaded onto the system, the system comprising:

an image digitizer having a page detection means for detecting the pre-recorded page identifier when the sheet of paper is first mounted onto said system and for detecting the pre-recorded page identifier when the sheet of paper is re-loaded onto said system; and a computer system interfaced with said image digitizer, said computer system comprising:

page searching means for identifying that the sheet of paper has not been previously loaded onto the system when the sheet of paper is first loaded onto the system and for identifying the sheet of paper when it is re-loaded onto the system, said page searching means identifying the sheet of paper using the pre-recorded page identifier;

access means interfaced with said page searching means for retrieving the electronic file of annotations previously made to the sheet of paper when the sheet of paper is reloaded onto the system;

recording means interfaced with said page detection means for recording annotations made to the sheet of paper in the electronic file, said electronic file indexed to the pre-recorded page identifier; and display means for displaying annotations made to the sheet of paper.

4. The system of claim 3, wherein the page identifier comprises a multiplicity of pre-positioned areas, markings on the pre-position areas defining the page identifier, the image digitizer comprising:

a plurality of photocells, each associated with a pre-positioned area for detecting the presence of the marking and for generating a detection signal in response to the detection of the marking, the identification signal comprising each of the detection signals so generated.

5. A method of operating an image digitizer system comprising the steps of:

mounting a first sheet of paper in said image digitizer system;

recording electronically information written on said first sheet of paper in a first electronic file associated with said first sheet;

removing said first sheet of paper from said digitizer system;

mounting a second sheet of paper in said image digitizer system;

recording electronically information written on said second sheet of paper in a second electronic file associated with said second sheet;

remounting said first sheet of paper in said image digitizer system;

detecting the pre-recorded markings on said first sheet of paper;

searching for said first electronic file associated with said first sheet;

retrieving said first electronic file associated with said first sheet;

recording information relating to said first sheet of paper in said first electronic file.

6. The method of claim 5, wherein each sheet of paper includes pre-recorded markings indicative of the page number associated with said first sheet and said second sheet and wherein the pre-recorded markings are detectable by said image digitizer system.

* * * * *